United States Patent
Rouh et al.

(10) Patent No.: US 10,185,873 B2
(45) Date of Patent: Jan. 22, 2019

(54) METHOD AND A DEVICE FOR TRACKING CHARACTERS THAT APPEAR ON A PLURALITY OF IMAGES OF A VIDEO STREAM OF A TEXT

(71) Applicant: IDEMIA IDENTITY & SECURITY, Issy-les-Moulineaux (FR)

(72) Inventors: Alain Rouh, Issy-les-Moulineaux (FR); Jean Beaudet, Issy-les-Moulineaux (FR)

(73) Assignee: IDEMIA IDENTITY & SECURITY, Issy-les-Moulineaux (FR)

( * ) Notice: Subject to any disclaimer, the term of this patent is extended or adjusted under 35 U.S.C. 154(b) by 243 days.

(21) Appl. No.: 14/962,557

(22) Filed: Dec. 8, 2015

(65) Prior Publication Data

US 2016/0162733 A1 Jun. 9, 2016

(30) Foreign Application Priority Data

Dec. 8, 2014 (FR) ...................................... 14 62021

(51) Int. Cl.
*G06K 9/00* (2006.01)
*G06T 3/00* (2006.01)
(Continued)

(52) U.S. Cl.
CPC ...... *G06K 9/00469* (2013.01); *G06K 9/00711* (2013.01); *G06K 9/325* (2013.01);
(Continued)

(58) Field of Classification Search
CPC ........... G06K 9/00469; G06K 9/00711; G06K 9/325; G06T 2207/30176; G06T 3/0075; G06T 7/277; G06T 7/38
See application file for complete search history.

(56) References Cited

U.S. PATENT DOCUMENTS

2015/0254507 A1* 9/2015 Lin .......................... G06K 9/18
382/176

OTHER PUBLICATIONS

French Preliminary Search Report dated Nov. 9, 2015 in French Application 14 62021 filed on Dec. 8, 2014 (with English Translation of Categories of Cited Documents).
(Continued)

*Primary Examiner* — Nirav G Patel
(74) *Attorney, Agent, or Firm* — Oblon, McClelland, Maier & Neustadt, L.L.P.

(57) ABSTRACT

The tracking method comprises, for at least a first image of the text having at least a first line of characters:
applying a prediction of a movement to which the text is subjected between the first image and a second image of the video stream, the movement prediction being applied to at least one second line of characters of the second image;
determining at least one alignment hypothesis for aligning the first line with the second line after applying the movement prediction;
estimating for each alignment hypothesis, a geometrical transformation between the first line and the second line resulting in that alignment; and
evaluating a character match metric for each alignment hypothesis, the metric being evaluated from signatures calculated on the characters of at least one line of the first image and signatures calculated on the characters of at least one line of the second image put into correspondence with the characters of said at least one line of the first image after applying the geometrical transformation associated with the alignment hypothesis.

13 Claims, 4 Drawing Sheets

(51) Int. Cl.
G06K 9/32 (2006.01)
G06T 7/38 (2017.01)
G06T 7/277 (2017.01)

(52) U.S. Cl.
CPC ............ *G06T 3/0075* (2013.01); *G06T 7/277* (2017.01); *G06T 7/38* (2017.01); *G06T 2207/30176* (2013.01)

(56) References Cited

OTHER PUBLICATIONS

Trung Quy Phan, et al., "Recognition of Video Text Through Temporal Integration", 12$^{th}$ International Conference on Document Analysis and Recognition, IEEE, 2013, 5 pgs.
Carlos Merino-Gracia, et al., "Real-time text tracking in natural scenes", IET Computer Vision, vol. 8, (6), 2014, 12 pgs.
Xuejian Rong, et al., "Scene Text Recognition in Multiple Frames Based on Text Tracking", IEEE International Conference on Multimedia and Expo (ICME), 2014, 6 pgs.

\* cited by examiner

In-2

In-1

In

METHOD AND A DEVICE FOR TRACKING CHARACTERS THAT APPEAR ON A PLURALITY OF IMAGES OF A VIDEO STREAM OF A TEXT

BACKGROUND OF THE INVENTION

The invention relates to the general field of processing video stream images.

The invention relates more particularly to a method of tracking characters that appear in images (i.e. frames) of a video stream of a document that contains text made up of one or more lines of characters. Each image of the video stream represents all or part of the text. No limit is associated with the document medium under consideration nor with the form of the text, nor indeed with the type of sensors used for acquiring the images. Thus, by way of example, such a document may be a page of an identity document having marked thereon lines of characters in a machine readable zone (MRZ), a number plate, etc. The sensor may be a camera, a contactless sensor, such as a contactless biometric sensor, a sensor embedded in a mobile telephone such as a smartphone, or it may be constituted by a plurality of sensors, etc., with the document traveling past the sensor(s) and with the sensor(s) being suitable for remotely acquiring partial or complete images of the document in question.

In known manner, the images constituting a video stream differ from static images of the kind that can be taken by a still camera, for example, in that the images of a video stream possess time redundancy: a given line of text appears on a plurality of contiguous video frames. Advantage may be taken of this time redundancy in order to improve the chances of locating a text and of recognizing the characters of the text, such as portions of the text appearing under conditions that vary from one frame (image) to another. The purpose of tracking characters that appear in a plurality of images of a video stream is thus to determine the positions of the characters in continuous and accurate manner in the dynamic scenes conveyed by the images of the video stream.

In the present state of the art, most tracking methods rely on forming a complete image of the document by aligning partial images, a technique that is also known as "mosaicing". Such alignment can be performed in particular by correlating images with one another (known as "template matching"), or by extracting remarkable points such as, for example: so-called "scale invariant feature transform" (SIFT) points as described in the document by D. G. Lowe entitled "Object recognition from local scale-invariant features", Proceedings of the International Conference on Computer Vision, Vol. 2, pp. 1150-1157, 1999. Thereafter, reconstruction of the complete image makes it possible to perform conventional reading of the document by recognizing the characters in the image.

Depending on the document in question, the image that is reconstructed by mosaicing may present reconstruction defects. For example, for an identity document and for reading the lines of the MRZ, putting partial images into alignment is made difficult by the repetition or the quasi-periodicity of certain character patterns (e.g. chevrons) that may give rise to matching ambiguities that are complicated to solve.

The document by S. Uchida et al., entitled "Mosaicing-by-recognition for video-based text recognition", Pattern Recognition 41.4, 2008, pp. 1230-1240, proposes a method relying on aligning images by character recognition: the problems of mosaicing and of recognition are formulated as a single optimization problem, thereby making it possible to act in simultaneous and collaborative manner to handle both of these aspects and thereby obtain greater accuracy. Characters are aligned on the basis of being recognized and by relying on similarity between images at successive instants.

Nevertheless, as indeed emphasized by Uchida et al., that method is relatively complex.

Furthermore, the recognition of characters in the manner proposed by Uchida et al. is particularly sensitive to variations in image acquisition conditions (e.g. the existence of a reflection between two images, sampling, changes in lighting, the presence of blurring, etc.). Thus, a small variation in the image can result in erroneous detection: a typical example is a small variation of appearance in a character "2" that might lead to it being recognized as a "Z".

There thus exists a need for a method of tracking video images that does not present such drawbacks.

OBJECT AND SUMMARY OF THE INVENTION

The invention satisfies this need in particular by providing a tracking method for tracking characters that appear in a plurality of images in a video stream of a text including at least one line of characters, said images being acquired by means of at least one sensor at different instants and each representing at least a portion of the text, the method comprising, for at least one first image of the video stream having at least one first line of characters:

an application step of applying a prediction of a movement to which the text is subjected between the first image and a second image of the video stream, the movement prediction being applied to at least one second line of characters of the second image;

a determination step of determining at least one alignment hypothesis for aligning said at least one first line of characters of the first image with said at least one second line of characters of the second image after applying the movement prediction;

an estimation step of estimating, for each alignment hypothesis, a geometrical transformation between the first line and the second line of characters resulting in that alignment; and an evaluation step of evaluating a character match metric for each alignment hypothesis, the metric being evaluated from signatures calculated on the characters of at least one line of characters of the first image and signatures calculated on the characters of at least one line of characters of the second image put into correspondence with the characters of said at least one line of characters of the first image after applying the geometrical transformation associated with the alignment hypothesis.

Correspondingly, the invention also provides a tracking device for tracking characters that appear in a plurality of images in a video stream of a text including at least one line of characters, said images being acquired by means of at least one sensor at different instants and each representing at least a portion of the text, the device comprising modules that are activated for at least one first image of the video stream having at least one first line of characters:

to apply a prediction of a movement to which the text is subjected between the first image and a second image of the video stream, the movement prediction being applied to at least one second line of characters of the second image;

to determine at least one alignment hypothesis for aligning said at least one first line of characters of the first image with said at least one second line of characters of the second image after applying the movement prediction;

to estimate, for each alignment hypothesis, a geometrical transformation between the first line and the second line of characters resulting in that alignment; and to evaluate a character match metric for each alignment hypothesis, the metric being evaluated from signatures calculated on the characters of at least one line of characters of the first image and signatures calculated on the characters of at least one line of characters of the second image put into correspondence with the characters of said at least one line of characters of the first image after applying the geometrical transformation associated with the alignment hypothesis.

The term "tracking" is used herein to mean recognizing which instance of a character in an image corresponds to which other instance of the same character in another image.

Thus, unlike the prior art, the invention does not rely on mosaicing, nor does it rely on character recognition, which can be found to be very sensitive to image acquisition conditions.

On the contrary, the invention provides a method of tracking characters in a text that appears in a plurality of images of a video stream that is based on evaluating alignment hypotheses that are determined by comparing lines of at least two distinct images representing the same portion of a text, after taking account of the movement of the text between the two images by using a prediction of that movement.

The first image designates the image under consideration by the invention at a current instant, whereas the second image designates the image having lines of characters that are associated with the lines of characters of the first image in order to perform character tracking. The second image may equally well be an image acquired at an instant prior to the first image, or on the contrary at a subsequent instant. Thus, depending on the ordering of the first and second images, the term "movement to which the text is subjected between the first image and the second image" means the movement to which the text on the first image has been subjected relative to its prior position on the second image when the second image is prior to the first image (i.e. the movement took place, properly speaking, from the second image to the first image), or the movement to which the text has been subjected on the second image relative to its prior position in the first image when the second image is subsequent to the first image (i.e. the movement that took place properly speaking between the first image and the second image).

The prediction model used for predicting the movement of the text between the two images naturally depends on image acquisition conditions, and it may be associated in particular with the form of the sensor. Thus, by way of example, certain contactless biometric sensors can require the text to be moved in a manner that, to a first approximation, lies in a plane parallel to the sensor of the camera. Such a movement in the image between two instants may be approximated by combining a movement in rotation and a movement in translation, and it is possible to make a constant speed movement hypothesis.

Naturally, other movement models may be envisaged.

Each alignment hypothesis determined by the invention is characterized by a movement between the images that is associated in particular with image acquisition conditions, and it is modeled by a geometrical transformation that may for example comprise a movement in rotation and/or a movement in translation. Each hypothesis as determined from the predicted movement of the text between the images is then evaluated. The alignment hypotheses are preferably determined on the basis of a line of characters in the first image (e.g. the first line) and a line of characters of the second image after taking the predicted movement into account, and is then validated by evaluating metrics on all of the other lines of the images, if any (including or not the line used for determining the hypotheses).

For example, in a particular implementation, during the evaluation step, the metric associated with an alignment hypothesis is evaluated while taking account of all of the lines of characters of the first image or all of the lines of characters of the first image with the exception of the first line of characters for which the alignment hypothesis was determined.

Each alignment hypothesis is advantageously evaluated by means of metrics that are continuous, being calculated on the basis of signatures of characters put into correspondence by the alignment hypothesis. Such signatures are specific to each character: nevertheless they make it possible to avoid character recognition properly speaking, which can be problematic in certain circumstances, as mentioned above. In other words, in accordance with the invention, no character recognition is performed during the evaluation step. By way of example, the calculated signatures are descriptors calculated on the basis of binarizing characters, such as geometrical moments, or descriptors involving spatial frequency analysis such as Fourier components, arrays of filter banks, or indeed SIFT type descriptors, as mentioned above. Having recourse to such signatures instead of performing character recognition properly speaking as proposed by Uchida et al. or instead of comparing images pixel by pixel, makes it possible to obtain a metric that is continuous, and more robust in the face of image variation phenomena. In other words, a small variation gives rise to a mild (soft) variation in the metric, which remains continuous. In contrast, having recourse to an alphabet of characters made discrete for character recognition purposes, results in metrics that can be discontinuous, thereby leading to errors that are difficult to manage: for example, a "2" may be due to a small variation on an image been erroneously recognized as a "Z".

Furthermore, the invention is of complexity that is reasonable compared with the technique proposed by Uchida et al., in particular in terms of the computation time required.

If a plurality of alignment metrics corresponding respectively to a plurality of alignment hypotheses are evaluated for a given image, the tracking method of the invention may include a step of selecting an alignment hypothesis for the image that corresponds to the best character match metric among the plurality of alignment hypotheses (i.e. the maximum or the minimum depending on how the metric in question is defined).

It should be observed that the tracking method of the invention has numerous applications. By way of example, the metrics evaluated in accordance with the invention may be used subsequently for character recognition, in order to perform mosaicing, etc.

In a particular implementation, the determination step further comprises a verification step of verifying compatibility between the first line of characters of the first image and the second line of characters of the second image after applying the movement prediction, an alignment hypothesis being determined only if the first line of characters of the first image is compatible with the second line of characters of the second image.

The term "compatible" is used herein to mean that the lines which are taken into consideration for determining an alignment hypothesis are likely to represent the same line of text in the images they represent.

Thus, by way of example, during the verification step, the first line of characters of the first image and the second line of characters of the second image are considered as being compatible if a distance evaluated between the first line of characters and the second line of characters while taking the predicted movement into account (in other words, after applying the movement prediction) is less than a predetermined threshold.

Taking compatible lines into account makes it possible to limit the complexity of implementing the invention, and in particular to reduce the number of alignment hypotheses that are evaluated.

In a particular implementation, during the determination step, an alignment hypothesis is determined for aligning a first line of characters of the first image with a second line of characters of the second image after applying the movement prediction, if the first line and the second line present a number of characters put into correspondence by the alignment that is greater than a predetermined threshold.

Likewise, this implementation also makes it possible to limit the complexity of implementing the invention by retaining only the most probable offset hypotheses (i.e. those that lead to a greater number of characters put into correspondence). The term "put into correspondence" is used herein to mean that under the effect of the alignment associated with the hypothesis taken into consideration, the characters of each line are caused to coincide, i.e. they are superposed. This putting into correspondence does not in any way assume that the characters match, properly speaking.

In a particular implementation, the step of evaluating the metric associated with each alignment hypothesis comprises:
  for each line of characters of the first image, evaluating a statistical combination of distances between the signatures calculated on the characters of said line of characters and the signatures calculated on the corresponding characters of a line of characters of the second image that is compatible with said line of characters; and
  calculating a statistical combination of the statistical combinations of the distances as evaluated in this way on the lines of characters of the first image.

This statistical combination takes account only of the similarity between the characters that are aligned by the alignment hypothesis (in particular it does not take account of any geometrical consideration). The statistical combination under consideration may be an average of distances, or in more general manner it may be any statistical filtering.

In a variant, the evaluation step may further comprise determining an offset of the line of characters of the first image relative to the line of characters of the second image, and weighting the statistical combination of the distances between the signatures by the offset.

The weighting that is applied may in particular be a penalty derived from the offset: the greater the offset, the greater the penalty. This variant makes it possible to take account of an error in positioning the lines of characters when they are aligned in compliance with the alignment hypothesis under consideration, in other words it introduces geometrical considerations into the metric that is evaluated. Typically, the greater the geometrical distance (i.e. difference) between the lines of characters, the greater the penalty that needs to be applied for weighting the distances.

In a particular implementation, if a line of characters of the first image is compatible with a plurality of lines of characters of the second image, the metric takes account of the weighted statistical combination of the distances that is the smallest among the statistical combinations of the distances evaluated over said plurality of lines of characters of the second image.

This makes it possible to retain only the alignment hypothesis that is the most favorable, i.e. the hypothesis that leads to the greatest similarity of the aligned characters. If a given line of characters is compatible in appearance with a plurality of lines of characters, this serves to eliminate alignment hypotheses that are not very probable.

In a particular implementation, the method further includes a step of recognizing characters of the text by using the character match metrics evaluated for the alignment hypotheses.

As mentioned above, the tracking method may be coupled to recognizing characters of the text shown in the images. This recognition, which relies on the alignment hypotheses as evaluated in accordance with the invention, is advantageously robust and reliable.

In a particular implementation, the various steps of the tracking method are determined by computer program instructions.

Consequently, the invention also provides a computer program on a data medium, the program being suitable for being performed in a tracking device or more generally in a computer, the program including instructions adapted to perform steps of a tracking method as described above.

The program may use any programming language, and may be in the form of source code, object code, or code intermediate between source code and object code, such as in a partially complied form, or in any other desirable form.

The invention also provides a computer-readable data medium (or recording medium) that includes instructions of a computer program as mentioned above.

The data medium may be any entity or device capable of storing the program. For example, the medium may be storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium, such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides a system comprising:
  at least one sensor suitable for acquiring a plurality of images of a video stream of a text comprising at least one line of characters, the images being acquired by means of said at least one sensor at different instants and representing at least a portion of the text; and
  a tracking device of the invention for tracking characters appearing in the plurality of images.

The system benefits from the same advantages as the above-mentioned tracking method and device.

In other implementations and/or embodiments, it is also possible to envisage that the tracking method, the tracking device, and the system of the invention present some or all of the above-specified characteristics in combination.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
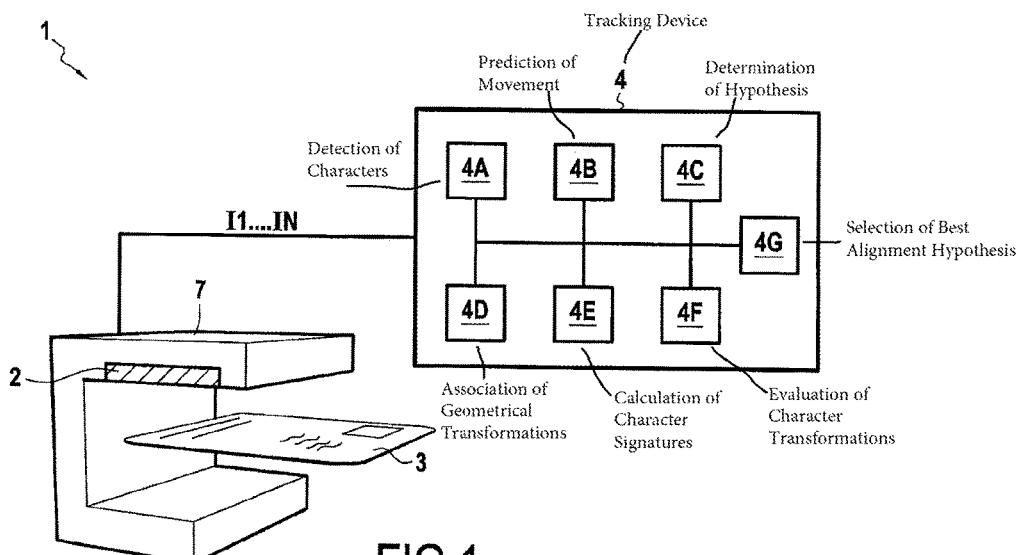
FIG. 1 is a diagram showing a system in accordance with the invention, in a particular embodiment.

FIG. 1 shows a particular embodiment of a system 1 in accordance with the invention in its environment.

The system comprises:
a sensor 2 suitable for acquiring a plurality of images (frames) of a text medium 3, the images forming a video stream; and
a tracking device 4 in accordance with the invention, suitable for tracking characters from the plurality of images acquired by the sensor 2.

Figure 2:
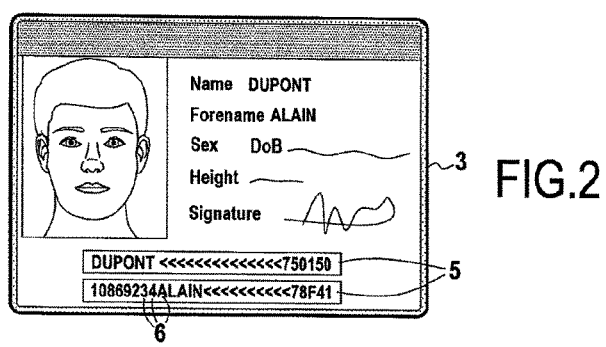
FIG. 2 shows an example of a text medium carrying a plurality of lines of characters, that are acquired by the FIG. 1 system as a plurality of images that are subjected to tracking in accordance with the invention.

The text medium 3 in this example is an identity document that includes in particular towards the bottom of the document a plurality of "MRZ" lines 5 (specifically two lines in this example), as shown diagrammatically in FIG. 2. Each line comprises a plurality of characters 6. In this example the characters 6 are alphanumeric characters (e.g. characters corresponding to a person's name, to a post code, etc.), chevrons, etc.

Nevertheless, no limit is associated with the type of text medium under consideration nor with the number of lines of characters present on the medium.

In the presently-described example, the sensor 2 is a sensor of a camera mounted on a conventional device 7 for contactless acquisition of images in a video stream. Its U-shape and the principle on which the device 7 operates require the document 3 to be presented between the arms of the device and to move in a manner that, to a first approximation, can be said to lie in a plane parallel to the sensor 2 of the camera, as shown diagrammatically in FIG. 2.

When the document 3 passes between the arms of the device 7, the sensor 2 remotely acquires a succession of "video" images or frames I1, . . . , IN making up a video stream in which the document 3 appears, where N is an integer strictly greater than 1. In the description, N designates the number of images on which the device 4 performs tracking of characters in the document 3. This number N may be less than the number of images actually acquired on the document 3 by the acquisition device 7. By way of example, it is assumed herein that when the tracking device 4 detects some predetermined number NO of successive images without characters among the images it has acquired, it stops tracking characters for the video stream under consideration. Naturally, other techniques could be envisaged for the purpose of identifying the images in the video stream on which tracking is to be performed.

Since the field of view of the sensor 2 is relatively small in this type of device, each video image In, n=1, . . . , N, is constituted in this example by a fragmentary image of the document 3 that represents only a portion of each MRZ line, as acquired at a respective instant tn. The number N of successive images acquired by the sensor 2 depends on the sampling speed of the sensor and on the speed with which the document 3 is passed in front of the sensor. Furthermore, it is assumed that these speeds are such that two successive images overlap in part, in other words they have at least one portion of the document 3 and/or of the text marked on the document in common.

Nevertheless, the invention is not limited to this type of sensor and/or this type of video stream acquisition device. Thus, by way of example, it is possible to envisage other sensors that are capable of co-operating remotely, such as for example a sensor forming part of a smartphone, or any other type of sensor enabling successive images to be acquired of a video stream representing a document.

Figure 3:
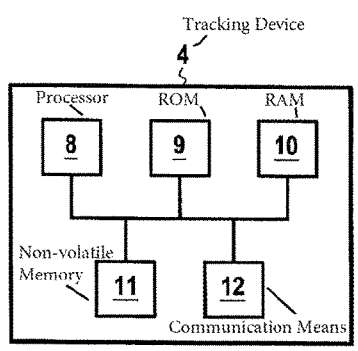
FIG. 3 shows the hardware architecture of a tracking device in accordance with the invention, in a particular embodiment.

In the presently-described embodiment, the tracking device 4 has the hardware architecture of a computer, as shown diagrammatically in FIG. 3.

It comprises in particular a processor 8, a ROM 9, a random access memory (RAM) 10, a non-volatile memory 11, and communication means 12 enabling it to communicate, in particular with the image acquisition device 7 in order to recover the video images I1, . . . , IN that it acquires. These communication means 12 may incorporate, by way of example: a universal serial bus (USB) port enabling the tracking device 4 to be connected to the acquisition device 7, or a network card enabling it to communicate, e.g. over a local telecommunications network to which the acquisition device 7 is also connected (e.g. a wireless fidelity (WiFi) network or a wireless local area network (WLAN), etc.

The ROM 9 of the tracking device 4 constitutes a data medium in accordance with the invention, which is readable by the processor 8 and which, in this example, stores a computer program in accordance with the invention, including instructions for executing steps of a tracking method in accordance with the invention.

In a variant, the computer may be found in a remote device (e.g. a server) to which the tracking device 4 is connected, e.g. via a telecommunications network.

In equivalent manner, the computer program defines functional modules (software modules in this example) of the tracking device 4 and their interactions, such as in particular in the presently-described embodiment: a module 4A for detecting characters in an image; a module 4B for predicting a movement of the text from one image to another, and for applying the movement prediction as determined in this way; a module 4C for determining hypotheses concerning the alignment of lines of characters in at least two images; a module 4D for associating geometrical transformations with these alignment hypotheses; a module 4E for calculating character signatures; a module 4F for evaluating character match metrics for each of the alignment hypotheses; and a module 4G for selecting the best alignment hypothesis for each image under consideration. These functions performed by the modules 4A to 4G are described below with reference to the steps of the tracking method of the invention.

Figure 4:
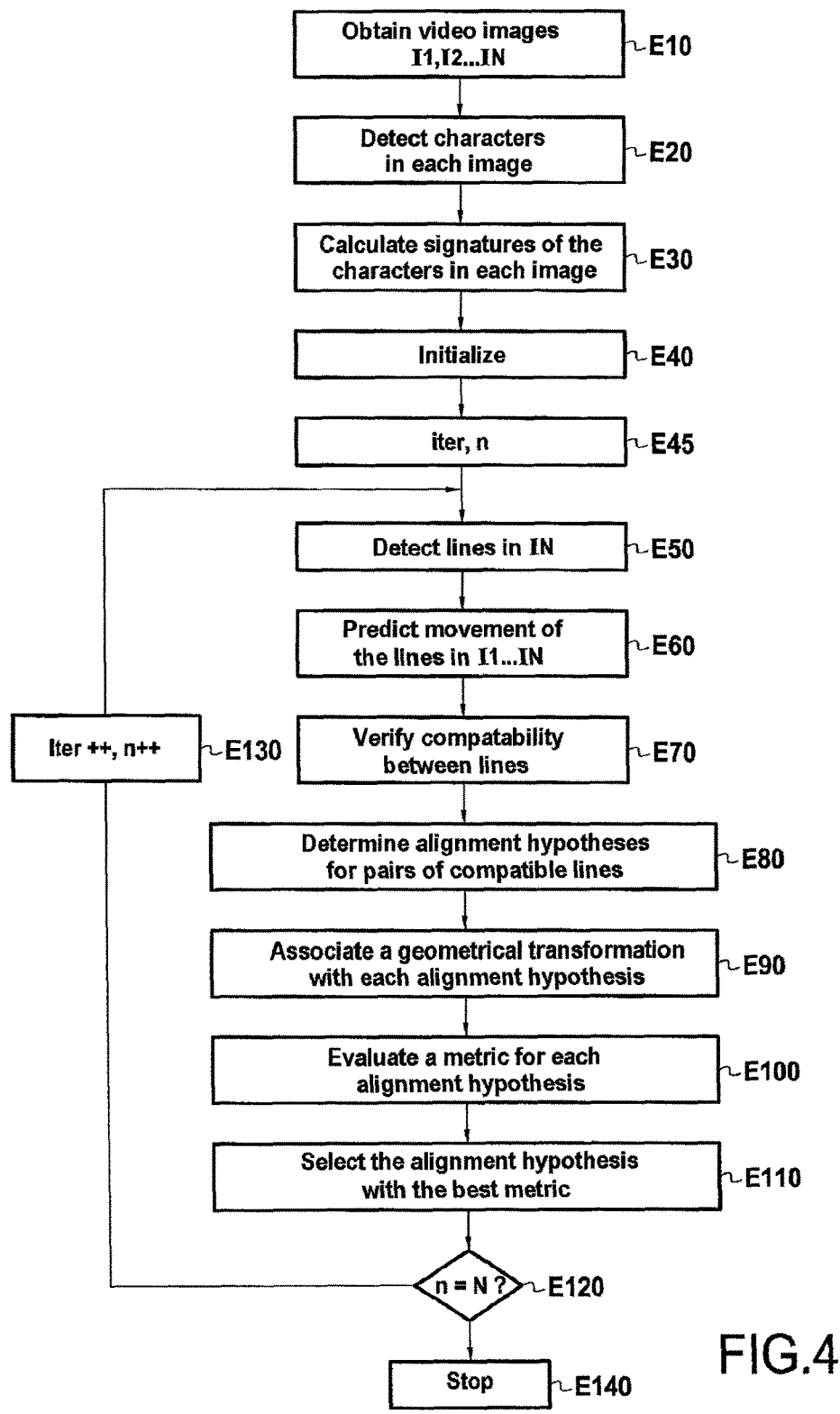
FIG. 4 is in the form of a flow chart showing the main steps of a tracking method of the invention, in a particular implementation.

With reference to FIG. 4, there follows a description of the main steps of a tracking method of the invention, in a particular implementation in which the method is performed by the tracking device 4 shown in FIG. 1.

It is assumed that the tracking device 4 has used its communication means 12 to obtain the successive video images I1, . . . , IN of the document 3 as acquired by the sensor 2 (step E10). These images are stored in the nonvolatile memory 11 of the tracking device 4.

In the presently-described implementation, after obtaining the images I1, . . . , IN, the tracking device 4 uses its module 4A to detect the characters present in each of the images I1, . . . , IN (step E20). For this purpose, the character detection module 4A uses conventional detection techniques, such as, for example: a technique consisting in binarizing each image followed by extracting connected components, as described in particular in the document by L. Eikvil entitled "Optical character recognition", December 1993.

Thereafter, for each character detected in an image In, n=1, . . . , N, the tracking device 4 calculates a signature for the character by using its signature calculation module 4E (step E30).

A character signature is made up of one or more characteristics extracted from the character and that enable it to be recognized and/or reconstructed. In the presently-described implementation, it is in the form of a vector having components that correspond to the characteristics extracted from the character. It is preferably selected so as to be invariant under certain transformations (e.g. a change of scale, contrast, rotation, etc.), which transformations may vary as a function of the application under consideration.

Such signatures are described in particular in the document by Trier et al. entitled "Feature extraction methods for character recognition—a survey", Pattern Recognition 29.5, 1996, pp. 641-662, and in the document by S. Belongie et al. entitled "Shape context: a new descriptor for shape matching and object recognition", NIPS Vol. 2, 2000. Examples comprise: geometrical moments, Zernike moments, Fourier descriptors, shape contexts, etc.

In the presently-envisaged example, it is assumed for example that the signatures that are calculated are shape contexts as described in the above-mentioned document by S. Belongie.

These signatures present the advantage of being continuous and they are known to be robust against image variations. In other words, they vary little in the presence of small variation in an image.

At the end of step E30, the tracking device 4 thus has a plurality of signatures for each image In, n=1, . . . , N, which signatures are in the form of vectors having components that are given by the signature characteristics extracted for each character present in an image In (i.e. in each line shown in the image In).

In the presently-described implementation, the tracking device 4 then tracks the text shown on the document 3 by processing the images acquired by the sensor 2 in an iterative manner.

For each iteration, iter=n (step E45, test step E120, and implementation step E130), the tracking device 4 considers the image In that was acquired at instant tn (the "current" image), and compares it in this example with the images acquired at instants prior to tn (or at least with one such image).

In a variant, the tracking device 4 may also compare the image with images that are acquired at later instants.

Figure 5A:
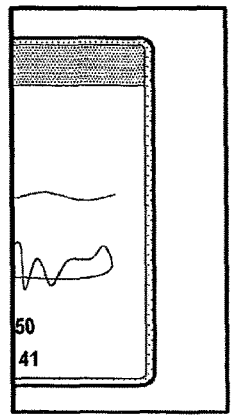
FIGS. 5A to 5C show examples of images of a text acquired at different instants.
Figure 5B:
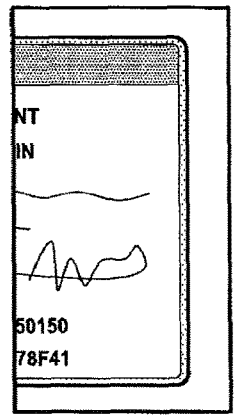
Figure 5C:
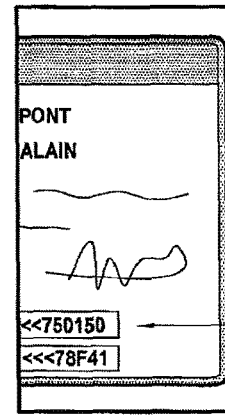

In order to facilitate understanding the processing performed by the tracking device 4 on each iteration, FIGS. 5A to 5C show by way of illustration only three images In-2, In-1, and In as acquired in succession by the tracking device 4, and representing a portion of the two MRZ lines of document 3.

More specifically, the tracking device 4 begins by using its character detection module 4A to detect lines of text comprising characters that are present in the image In (step E50). The first line of characters shown in the image In and detected by the module 4A is referenced ln1; the line ln1 is a first line of characters of a first image in the meaning of the invention. In this example, the module 4A determines the position of each character of the line ln1 together with the barycenter (center of gravity) of each character.

In a variant, the module 4A may determine the position of each character in a line of characters detected in the image In other than the first line.

Thereafter, the tracking device 4 uses its movement prediction module 4B to predict the position at instant tn of the lines of characters detected in the preceding images I1, . . . In-1 (step E60). In the presently-described implementation, when a given line of characters has been detected in a plurality of preceding images, attention is given only to the most recent image in which the line has been detected. In the example of FIG. 5, the tracking device 4 thus retains only the image In-1.

In a variant, all of the images may be taken into account, or only some of them.

In other words the tracking device 4 and its module 4B predict the movement to which the text has been subjected between the image In and the previous images, or more precisely in this example, if account is taken of the order of the images, they predict the movement of the text between image In-1 and the current image In. For this purpose, the module 4B relies on a movement model that is determined by taking account of constraints imposed by the sensor 2, and it applies the model to the lines of characters in the preceding image.

More precisely, the shape of the acquisition device 7 and of its sensor 2 leads to the document 3 performing movement that, to a first approximation, lies in a plane that is parallel to the sensor 2 of the camera, as shown in FIG. 1. As a result, the image moves between two instants $t$ and $t+\Delta t$ in a manner that may be approximated by a component in translation T and a component in rotation R relative to some arbitrary point (e.g. in this example the origin of the image reference frame), the movement being written $(ToR)_{t,t+\Delta t}$.

In the presently-described embodiment, the module 4B performs "constant speed" prediction. This enables it, from a translation-rotation $(ToR)_{tx,ty}$ as estimated between two instants tx and ty, to deduce a translation-rotation $(ToR)_{ty,tz}$ that is extrapolated between two instants ty and tz.

More specifically:
if the rotation is negligible, the combination (ToR) may be approximated merely as a single movement in translation T. In obvious manner, this gives:

$$T_{ty,tz} = \frac{tz-ty}{ty-tx}T_{tx,ty}$$

otherwise, a combination of a movement in translation and a movement in rotation may be expressed in the form of rotation about a certain center written $\underline{c}$, i.e.: $(ToR)=R_c$ with $c=(I-R)^{-1}T$, where I designates identity. The combination $(ToR)_{ty,tz}$ is then expressed as the extrapolation of this rotation $R_c$: it is a rotation about the same center $\underline{c}$, through an angle $\theta_{ty,tz}$, such that:

$$\theta_{ty,tz} = \frac{tz-ty}{ty-tx}\theta_{tx,ty}$$

In the presently-envisaged example, tz=tn is the instant at which the image In was acquired, and tx and ty depend on the preceding image that is taken into consideration. In other words, the module 4B deduces the movement (i.e. the combination ToR) to which a line of text has been subjected between an image earlier than In acquired at an instant ty and the image In itself, on the basis of the movement that was estimated at a preceding iteration between the image acquired at the instant ty and an image acquired at an instant tx. For example, the module 4B deduces (predicts) the movement to which a given line will be subjected between the image In-1 and the image In on the basis of an estimate of the movement to which the text was subjected between the image In-2 and the image In-1.

The module 4B applies the prediction (or the predictions if a plurality of images acquired at different instants are taken into consideration) for the movement as determined in this way and obtains one or more lines lj. A line lj thus designates a line of an earlier image (e.g. the image In-1) after applying the predicted movement for the text between the earlier image and the current image In.

Figure 6:
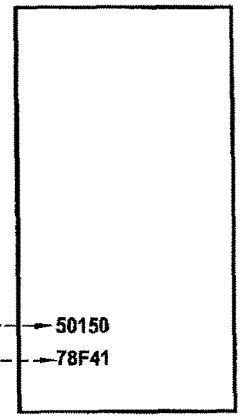
FIG. 6 shows two lines of the image shown in FIG. 5B after applying a movement as predicted by the tracking device of the invention.

FIG. 6 shows the lines lj(1) and lj(2) obtained for the image In-1 of FIG. 5.

It should be observed that when iter is less than or equal to 2, it is not possible to predict the movement of the text at constant speed. An initialization stage may thus be performed for iteration iter=1, and an adjustment of the tracking may be considered for iteration iter=2, as described in greater detail below.

Thereafter, in the presently-described implementation, the tracking device 4 uses its module 4C for determining alignment hypotheses to verify compatibility between each line rj obtained in step E60 and the line ln1 (step E70). This is to ensure that only line lj of images prior to In that might correspond to the same line as ln1 are conserved.

For this purpose, for each line lj, the module 4C calculates the distances of each of the ends of the line ln1 from the infinite straight line carrying the line lj (the line lj taking account of the predicted movement). The line lj is considered as being compatible with the line ln1 if and only if the maximum of the two calculated distances is less than a predetermined threshold THRcomp. The threshold THRcomp may be determined empirically and is selected as a function of a compromise between complexity and performance.

Thereafter, the module 4C takes into consideration only those lines that are determined as being compatible with the line ln1. In the example shown in FIG. 6, the module 4C thus takes into consideration only the line lj(1).

Naturally, in variants it is possible to consider other ways of testing compatibility between two lines.

For every pair of compatible lines (ln1,lj), the module 4C then determines one or more alignment hypotheses (step E80). Each alignment hypothesis is defined by a triplet (ln1,lj,x) where $\underline{x}$ designates a character offset between lines ln1 and lj.

Figure 7A:
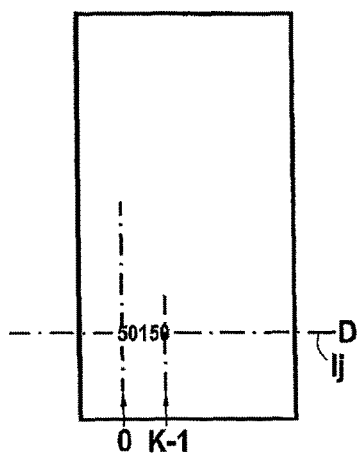
FIGS. 7A and 7B show different conventions applied by the tracking device of the invention for determining alignment hypotheses in accordance with a particular implementation.

For this purpose, in the presently-described implementation, a local reference frame is placed on the line lj such that the first character of this line is at the point 0 on the abscissa axis and the last character is at point K-1, where K designates the number of characters shown on the line lj. This reference frame is shown in FIG. 7A.

Figure 7B:
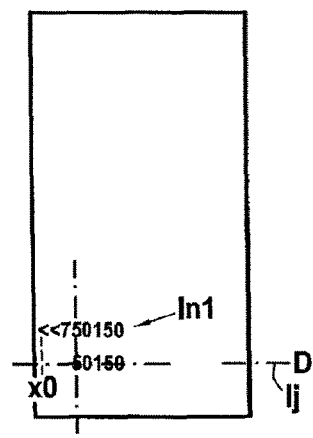

Thereafter, the module 4C calculates the projection x0 of the first character of the line ln1 onto the (infinite) straight line D carrying the line lj, as shown in FIG. 7B. The point along the abscissa axis corresponding to x0 constitutes an offset in "character" units between the two lines ln1 and lj. By way of example, it is assumed that x0=-2.1.

It should be observed that when the spacing between characters is variable, the conversion into character units is not necessarily linear.

Thereafter, for every integer offset $\underline{x}$ of characters between the lines ln1 and lj, in a neighborhood of x0 (e.g. in the range [x0-2,x0+2]), the module 4C counts the number of characters that are put into correspondence between ln1 and lj when considering an alignment of the two lines as results from the offset x.

Figure 8:
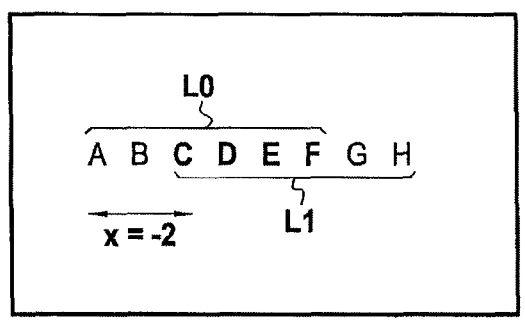
FIG. 8 shows two lines of characters that overlap after applying a geometrical transformation associated with an alignment hypothesis as determined by the tracking device of the invention in a particular implementation.

In order to illustrate the way in which the module 4C operates, consideration is given by way of example to two lines L0 and L1 made up in entirely arbitrary manner of the following characters: L0=ABCDEF and L1=CDEFGH. These letters are given only for reasons of illustration, and they are not known to the module 4C (no character recognition). It is assumed that x0=-2.1 for line L0, with the local reference frame being attached to L1. In this example, for x=-2, the characters that are put into correspondence are CDEF for the line L0 and CDEF for the line L1, as shown in FIG. 8 (in this figure, the characters that are put into correspondence by the alignment hypothesis are shown bold). For x=-1, the characters that are put into correspondence are BCDEF for the line L0 and CDEFG for the line L1. For x=1, the characters that are put into correspondence are ABCDE for the line L0 and DEFGH for the line L1, etc.

The module 4C retains only those offsets $\underline{x}$ that lead to a number of characters that are put into correspondence being greater than a predetermined threshold THRalign. For example, THRalign=2. Each triplet (ln1,lj,x) as determined in this way constitutes an alignment hypothesis in the meaning of the invention for aligning the line ln1 with the line lj.

At the end of step E80, the module 4C thus has at least one alignment hypothesis for each pair of compatible lines (ln1,lj).

The tracking device 4 then associates each alignment hypothesis (ln1,lj,x) as determined in this way by its module 4D with a geometrical transformation $(ToR)_{(ln1,lj,x)}$ (step E90). In the presently-described implementation, this geometrical transformation is the combination of a (movement in) rotation $R_{(ln1,lj,x)}$ and a (movement in) translation $T_{(ln1,lj,x)}$, with reference to the above-described movement model.

More precisely, the module 4D considers the segments of characters that have been put into correspondence for each alignment hypothesis. The angle of the rotation $R_{(ln1,lj,x)}$ is defined in the presently-described implementation as the angle of rotation between the segments. The translation $T_{(ln1,lj,x)}$ is defined as being the movement that, after applying the rotation $R_{(ln1,lj,x)}$ brings the barycenters of the segments into alignment.

Thus, each alignment hypothesis (ln1,lj,x) defines a specific geometrical transformation $(ToR)_{(ln1,lj,x)}$ resulting in the lines ln1 and lj having the alignment $\underline{x}$.

Thereafter, each alignment hypothesis (ln1,lj,x) is evaluated by the tracking device 4 using its evaluation module 4F (step E100). For this purpose, the evaluation module 4F relies on the signatures calculated in step E30 by the signature calculation module E4.

More specifically, the module 4F acts for each alignment hypothesis to evaluate a character match metric. Depending on the value and the form used for this metric, it represents the similarity or dissimilarity between the characters put into correspondence by each alignment hypothesis.

In the presently-described implementation, the metric evaluated by the module 4F takes account of all of the lines ln in the image In. It can be said to validate the alignment hypotheses formulated for the line ln1 relative to the other lines of the image In.

In order to evaluate this metric for each given alignment hypothesis (ln1,lj,x), the module 4F applies the geometrical transformation $(ToR)_{(ln1,lj,x)}$ associated with the hypothesis to all of the lines detected in the image prior to In and having the line lj (e.g. the image In-1 in this example). The lines obtained in this way after applying the geometrical transformation $(ToR)_{(ln1,lj,x)}$ are written lm. It should be observed that in the presently-described implementation, by definition of the geometrical transformation $(ToR)_{(ln1,lj,x)}$, the transformation is applied by the module 4F to the lines of the earlier image under consideration after applying thereto the movement prediction as determined in step E60.

This assumption is nevertheless not limiting. Thus, in a variant implementation, the geometrical transformation associated with the alignment hypothesis may take account of the movement prediction determined in step E60 and may be applied directly to the lines of the earlier images.

In a manner that is similar or identical to that performed in step E70 by the module 4C, the module 4F verifies the compatibility between the lines lm that have been obtained with the lines ln of the image In, and it retains only the pairs of lines (ln,lm) that are compatible.

For each compatible line pair (ln,lm), the module 4F determines an offset $\underline{y}$ between the lines (in a manner that is similar or identical to that performed in step E80 by the module 4C). This offset $\underline{y}$ is rounded to an integer offset y'. This offset leads to one or more characters being put into correspondence among the lines.

The module 4F then acts for each line ln of the image In to evaluate a penalty pp(ln) defined as the average of the distances between:
 the signatures of the characters of the lines ln put into correspondence by the alignment hypothesis with the characters of a line lm compatible with the lines ln; and
 the signatures calculated for the characters of the line lm put into correspondence with the above-mentioned characters of the line ln.

As mentioned above, in the presently-envisaged example, the calculated signatures are shape contexts, and the envisaged distance is a $\chi^2$ statistic that serves to compare shape contexts with one another, as described in the above-mentioned device by S. Belongie et al.

Nevertheless, these assumptions are not limiting in any way and other signatures may be envisaged, as may other functions enabling signatures to be compared with one another (which for simplification purposes are referred to in this description as "distances"), such as for example an L2 norm of the difference between the signatures of these characters. It is likewise possible to envisage filtering or statistical combination functions other than an average for calculating the penalty pp associated with each line ln.

Thereafter, the module 4F determines a score value sg on the basis of the difference (i.e. geometrical distance) y'-y. For example $sg=\exp((y'-y)^2)$.

This score value sg is used by the module 4F to weight the previously calculated average pp(ln) of the distances. In other words:

$$pp(\ln) \leftarrow pp(\ln) \times sg$$

If a plurality of lines lm are compatible with the lines ln, the module 4F performs the above-described penalty calculation pp(ln) for each line em, and in this example it retains as the penalty value pp(ln) for the line ln only the lowest value taken over the set of lines lm that are compatible with the line ln.

Thereafter, the module 4F allocates as the character match metric for the alignment hypothesis under consideration the average of the penalty values pp(ln) as evaluated in this way for all of the lines ln of the image In.

In a variant, other statistical combinations of the penalty values pp(ln) may be considered instead of the average.

Thereafter, the tracking device 4 uses its selection module 4G to select as the final alignment hypothesis the alignment hypothesis that corresponds in this example to the smallest character match metric evaluated for the image In, the metric used in the presently-considered example taking low values when the characters that are aligned by the alignment hypothesis are similar (step E110). In other words, and in general manner, the selection module 4G selects for the image In the alignment hypothesis that corresponds to the best of the metrics from among the metrics evaluated for all of the alignment hypotheses that have been determined for this image.

The tracking device 4 stores this alignment hypothesis in association with the image In, e.g. in its non-volatile memory 11.

The steps E50 to E110 are then reiterated for the N images acquired by the sensor 2 over which tracking is performed (test step E120 and implementation step E130).

In a variant, the tracking device 4 stops iterations as soon as it has detected a predetermined number of images that no longer contain characters.

As mentioned above, it should be observed that when the current iteration iter is less than or equal to 2, it is not possible to make use of a prediction of movement between the current image and a previously acquired image (or subsequently acquired depending on the order being used).

At iter=1 (initialization step E40), the tracking device 4 has no alignment history in its memory (i.e. no alignment hypothesis between two previously-considered images). Thus, at iteration iter=1, the tracking device 4 acts in the presently-described implementation to store the line l1 of the image In under consideration at this iteration (e.g. I1) without any alignment hypothesis.

At iteration iter=2, the tracking device 4 still cannot perform, properly speaking, a prediction of movement at constant speed since it has only one element in memory (associated with the image I1 processed at iteration iter=1). In order to take this situation into account, several options may be performed by the tracking device 4, such as for example:

- making a prediction at zero speed; and/or
- taking a larger range around x0 for the offset $\underline{x}$ in step E80; and/or
- not weighting the penalties pp(ln) by the geometrical distances y'−y in step E100 (while taking account only of similarities between signatures).

At the end of the iterative processing (step E140), the tracking device 4 possesses alignment hypotheses for the text shown in each image In relative to the text shown in the preceding images, and a metric that evaluates each of these hypotheses (an alignment hypothesis and the associated metric for each image In). Advantageously, the processing performed by the tracking device 4 during the steps E10 to E140 does not require any character recognition, which can be complex and risky, in particular as a function of the conditions under which the images and the text shown on the document 3 are acquired (e.g. the character fonts used, etc.).

The alignment hypotheses and their metrics can subsequently be used for a variety of purposes, such as for example for recognizing characters in the text of the document 3, for performing mosaicing, etc. Thus, by way of example, for character recognition, the alignment hypotheses stored in the memory 11 make it possible to identify a plurality of instances of one particular character in a plurality of images, to combine the signatures of that character as identified in the plurality of images, and to recognize the character on the basis of the resulting combination. In a variant, it is possible to begin by recognizing a character from signatures and then to use a voting mechanism on the other images representing the same character (as identified by the alignment hypotheses), in order to determine the most probable corresponding character.

The invention claimed is:

1. A tracking method for tracking characters that appear in a plurality of images in a video stream of a text including at least one line of characters, said images being acquired by at least one sensor at different instants and each representing at least a portion of the text, the method comprising, for at least one first image of the video stream having at least one first line of characters:
   - an application step of applying a prediction of a movement to which the text is subjected between the first image and a second image of the video stream, the movement prediction being applied to at least one second line of characters of the second image;
   - a determination step of determining at least one alignment hypothesis for aligning said at least one first line of characters of the first image with said at least one second line of characters of the second image after applying the movement prediction;
   - an estimation step of estimating, for each alignment hypothesis, a geometrical transformation between the first line of characters and the second line of characters resulting in that alignment; and
   - an evaluation step of evaluating a character match metric for each alignment hypothesis, the metric being evaluated from signatures calculated on the characters of at least one line of characters of the first image and signatures calculated on the characters of at least one line of characters of the second image put into correspondence with the characters of said at least one line of characters of the first image after applying the geometrical transformation associated with the alignment hypothesis, wherein
   the determination step further comprises a verification step of verifying compatibility between the first line of characters of the first image and the second line of characters of the second image after applying the movement prediction, an alignment hypothesis being determined only if the first line of characters of the first image is compatible with the second line of characters of the second image.

2. The tracking method according to claim 1, further comprising, when a plurality of alignment hypotheses are determined for said first image, a selection step of selecting for said first image the alignment hypothesis that corresponds to the best character match metric over said plurality of alignment hypotheses.

3. The tracking method according to claim 1, wherein during the verification step, the first line of characters of the first image and the second line of characters of the second image are considered as being compatible if a distance evaluated between the first line and the second line after application of the movement prediction is less than a predetermined threshold.

4. The tracking method according to claim 1, wherein during the determination step, an alignment hypothesis is determined for aligning a first line of characters of the first image with a second line of characters of the second image after applying the movement prediction, if the first and second lines present a number of characters put into correspondence by the alignment that is greater than a predetermined threshold.

5. The tracking method according to claim 1, wherein the geometrical transformation associated with the alignment hypothesis comprises a translation and/or a rotation.

6. The tracking method according to claim 1, wherein, during the evaluation step, the metric associated with an alignment hypothesis is evaluated while taking account of all of the lines of characters of the first image or all of the lines of characters of the first image with the exception of the first line of characters for which the alignment hypothesis was determined.

7. The tracking method according to claim 6, wherein the step of evaluating the metric associated with each alignment hypothesis comprises:
   - for each line of characters of the first image, evaluating a statistical combination of distances between the signatures calculated on the characters of said line and the signatures calculated on the corresponding characters of a line of characters of the second image that is compatible with said line; and
   - calculating a statistical combination of the statistical combinations of the distances as evaluated in this way on the lines of characters of the first image.

8. The tracking method according to claim 7, wherein the evaluation step further comprises determining an offset of the line of characters of the first image relative to the line of characters of the second image, and weighting the statistical combination of the distances between the signatures by the offset.

9. The tracking method according to claim 8, wherein, if a line of characters of the first image is compatible with a plurality of lines of characters of the second image, the metric takes account of the weighted statistical combination of the distances that is the smallest among the statistical combinations of the distances evaluated over said plurality of lines of characters.

10. The tracking method according to claim 1, further comprising a step of recognizing characters of the text by using the character match metrics evaluated for the alignment hypotheses.

11. A non-transitory computer readable data medium storing a computer program including instructions for executing steps of the tracking method according to claim 1.

12. A tracking device for tracking characters that appear in a plurality of images in a video stream of a text including at least one line of characters, said images being acquired by at least one sensor at different instants and each representing at least a portion of the text, the device comprising:

processing circuitry configured, for at least one first image of the video stream having at least one first line of characters, to apply a prediction of a movement to which the text is subjected between the first image and a second image of the video stream, the movement prediction being applied to at least one second line of characters of the second image, to determine at least one alignment hypothesis for aligning said at least one first line of characters of the first image with said at least one second line of characters of the second image after applying the movement prediction, to estimate, for each alignment hypothesis, a geometrical transformation between the first line of characters and the second line of characters resulting in that alignment, and to evaluate a character match metric for each alignment hypothesis, the metric being evaluated from signatures calculated on the characters of at least one line of characters of the first image and signatures calculated on the characters of at least one line of characters of the second image put into correspondence with the characters of said at least one line of characters of the first image after applying the geometrical transformation associated with the alignment hypothesis, wherein the processing circuitry is further configured to verify compatibility between the first line of characters of the first image and the second line of characters of the second image after applying the movement prediction, an alignment hypothesis being determined only if the first line of characters of the first image is compatible with the second line of characters of the second image.

13. A system comprising:

the at least one sensor configured to acquire the plurality of images of the video stream of the text comprising the at least one line of characters, the images being acquired by said at least one sensor at different instants and representing the at least a portion of the text; and the tracking device according to claim 12 for tracking the characters appearing in the plurality of images.

* * * * *